Patented Feb. 11, 1941

2,231,019

UNITED STATES PATENT OFFICE 2,231,019

EPI-ALLO-PREGNANEDIOL COMPOUNDS AND METHOD OF OBTAINING THE SAME

Russell Earl Marker, State College, Pa., assignor to Parke, Davis & Company, Detroit, Mich., a corporation of Michigan No Drawing. Original application March 12, 1937, Serial No. 130,582. Divided and this application June 20, 1938, Serial No. 214,841

5 Claims. (Cl. 260—397)

The invention relates to the preparation of a new diol compound, epi-allo-pregnanediol, and its derivatives.

This application is a division of my co-pending application, Serial No. 130,582, filed March 12, 1937.

In the parent application there is shown a method of preparing a theretofore unknown ketonic alcohol, epi-allo-pregnanol-(3)-one-(20), from its mixtures with pregnanediol and allo-pregnanediol or other like non-ketonic alcohols or sterols. This application has for one of its objects the utilization of epi-allo-pregnanol-(3)-one-(20) for the preparation of a new diol compound, epi-allo-pregnanediol, and its derivatives.

The new 3-epi-allo-pregnanediol-20 is obtainable from the epi-allo-pregnanol-(3)-one-(20) by catalytic reduction. The resulting diol compound may be converted to its acylated derivatives by reaction with acylating agents, e. g. acetic anhydride or like acylating agent.

The following examples will serve to illustrate the invention:

*3-epi-allo-pregnanediol-20.*—To a solution of 100 mg. of epi-allo-pregnanol-3-one-20 in 100 cc. of acetic acid are added 100 mg. of platinic oxide. This is shaken for 2 hours with hydrogen at 45 pounds pressure. The catalyst is filtered off and the acetic acid distilled under reduced pressure. The residue is crystallized from acetone, m. 205–207°. Mixed with allo-pregnanediol m. 242° it gives a depression in melting-point to 194°.

Anal. calcd. for $C_{21}H_{36}O_2$: C, 78.8; H, 11.3. Found: C, 78.8; H, 11.2.

*Diacetate of 3-epi-allo-pregnanediol-20.*—A solution of 100 mg. of 3-epi-allo-pregnanediol-20 in 5 cc. of acetic anhydride is refluxed for one hour. The acetic anhydride is evaporated under reduced pressure and the residue recrystallized from 60 percent acetone, m. 124°.

Anal. calcd. for $C_{25}H_{40}O_4$: C, 74.4; H, 10.0. Found: C, 74.5; H, 10.2.

The reduction of epi-allo-pregnanol-(3)-one-(20) into the new compound, 3-epi-allo-pregnanediol-20 may be illustrated as follows;

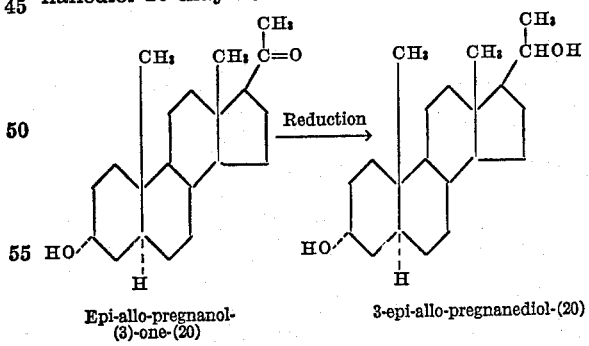

Epi-allo-pregnanol-(3)-one-(20)    3-epi-allo-pregnanediol-(20)

Epi-allo-pregnanol-3, 20 and its acyl derivatives are of value not merely as intermediates for the synthesis of other compounds, but also because they possess male sex hormone activity. For example, in its effect on the growth of the rat seminal vesicles, epi-allo-pregnanol-3, 20 is even more active than the male sex hormone, androsterone.

What I claim as my invention is:

1. Process of making 3-epi-allo-pregnanediol-(20) having a melting point about 207° C. which comprises catalytically hydrogenating epi-allo-pregnanol-(3)-one-(20).

2. 3-epi-allo-pregnanediol-(20) having a melting point about 207° C.

3. In the process of making a compound having the formula

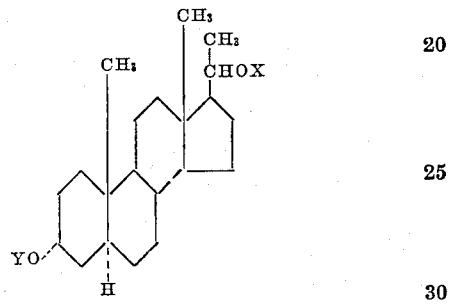

where OX and OY are members of the class consisting of hydroxyl and an organic carboxylic acid ester radical, the step of catalytically hydrogenating epi-allo-pregnanol-(3)-one-(20).

4. Process of making an organic carboxylic acid ester derivative of 3-epi-allo-pregnanediol-(20) which comprises reducing epi-allo-pregnanol-(3)-one-(20) to obtain the corresponding diol and treating the latter with an organic carboxylic acid acylating agent.

5. The diacetate of 3-epi-allo-pregnanediol-(20) of melting point approximately 124° C.

RUSSELL EARL MARKER.